Dec. 9, 1952 — H. BEHRENS — 2,621,073
PORTABLE DRINKING FOUNTAIN
Filed Oct. 3, 1949
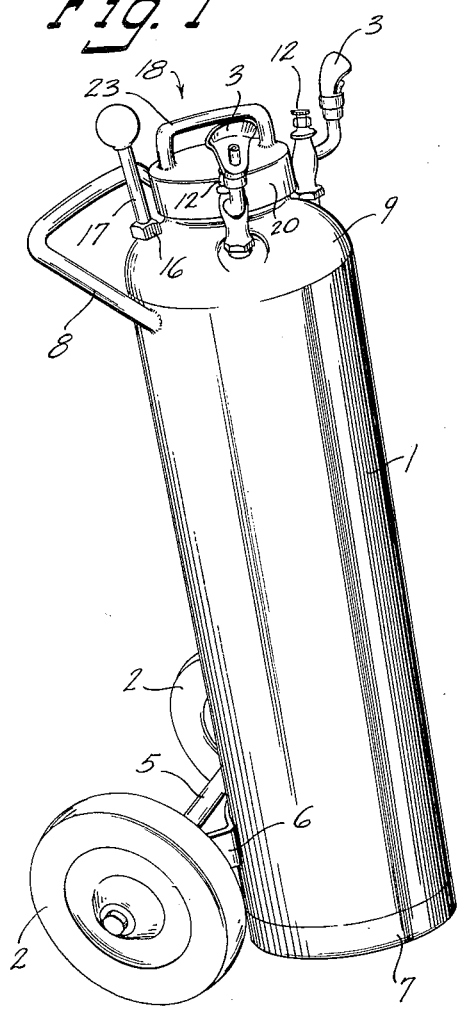
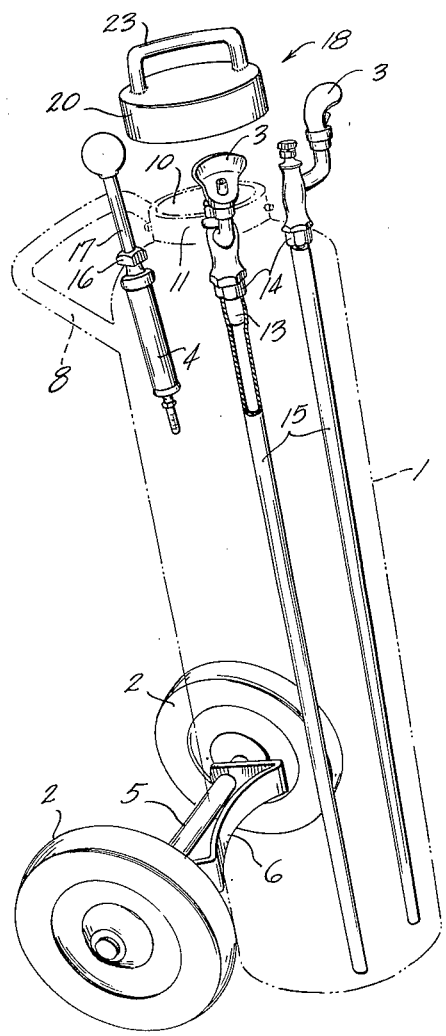
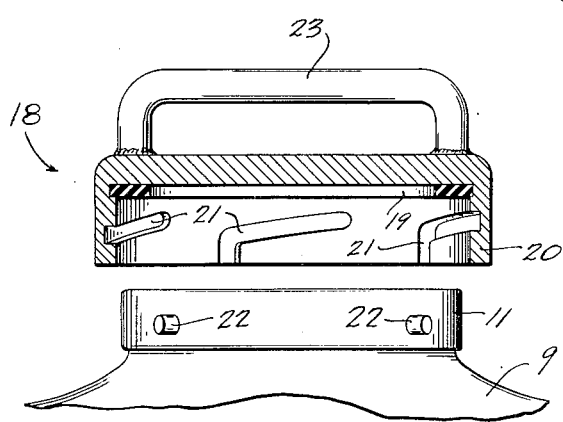
INVENTOR.
Herman Behrens
BY Andrus & Sceales
Attorneys Patented Dec. 9, 1952

2,621,073

UNITED STATES PATENT OFFICE 2,621,073

PORTABLE DRINKING FOUNTAIN

Herman Behrens, Waukesha, Wis., assignor to Behrens Manufacturing Co., Inc., Waukesha, Wis., a corporation of Wisconsin Application October 3, 1949, Serial No. 119,277

3 Claims. (Cl. 299—8)

This invention relates to liquid dispensing apparatus and has been embodied in a portable water bubbler.

The invention includes a portable pressure tank of appropriate dimensions having a hand pump and several nozzles controlled by hand-operated valves which provides a portable drinking fountain suitable for use at athletic events and the like.

An object of the invention is to provide for transporting of and dispensing of the water in a single, lightweight cart.

Another object is to reduce the amount of time normally required to supply a given number of people with drinking water.

Another object is to require less frequent filling of the tank.

Another object is to provide for adding of ice directly to the water.

Another object is to protect the inner parts of the filling cap from contamination upon removal of the cap from the tank as for filling.

Another object is to ensure sanitary conditions in delivering the drinking water.

These and other objects and advantages of the invention will be more fully set forth in the following description of a preferred embodiment of the invention illustrated in the accompanying drawing.

In the drawing:

Figure 1 is a perspective view of the device in position for use;

Fig. 2 is a view of the various parts of the device with the tank shown in outline and with the cover removed for filling;

Fig. 3 is an axial sectional view through the filling cap and showing the upper end of the tank.

The portable fountain shown in the drawings comprises the cylindrical tank 1 preferably of stainless steel, the pair of wheels 2 for transporting the tank, the fixtures 3 at the upper end of the tank from which the water is directed for drinking, and the air pump 4 by which tank 1 is pressurized to provide the working pressure head required to deliver the water as will be described.

The axle 5 on which wheels 2 are mounted is carried by the frame member 6 welded to the lower side of tank 1 so that the tank, on level ground, will stand upright on wheels 2 and the lower head 7 of the tank.

The tubular handle 8 welded to the side of tank 1 above wheels 2 is disposed for tilting the tank on the wheels and transporting the tank as a cart.

The upper head 9 of tank 1 is provided with a large central circular opening 10 defined by the rim 11 and three holes which are equally spaced around the opening and in which the two fixtures 3 and the pump 4 are mounted.

Tank 1 is of substantial length or height so that fixtures 3 at the top of the tank are disposed high enough to be reached by adults without stooping. The streams of water of the fixtures are directed upwardly and away from the tank. Up to three fixtures may be arranged about the top of tank 1 for use at the same time by three persons assembled about the device.

In the drawings, two fixtures are shown which are preferably disposed oppositely of handle 8 and include the push-type valves 12 for controlling the water discharge.

The lower stem 13 of each fixture is inserted in the respective hole in head 9 and secured by the nut 14 assembled on stem 13 through opening 10.

The dip-tube 15 secured on the lower reduced end of each stem 13 extends downwardly to near the bottom of tank 1. Tubes 15 may be of metal or preferably of plastic which is of lighter weight and is easier to keep clean.

Pump 4 extends within tank 1 and is secured in the corresponding hole in head 9 by the nut 16 fitting the upper end of the pump. The handle and pump rod 17 project from the upper end of the pump for operation as required to develop and maintain one or two pounds of pressure within the tank necessary to effect delivery of the water through tubes 14 and fixtures 3.

The circular cover 18 for closing and sealing opening 10 carries the gasket 19 which engages the top of rim 11. The flange 20 of cover 17 fits around rim 11 and is formed with the complementary bayonet-type locking grooves 21 which engage the pins 22 projecting from rim 11 to provide for securing or releasing cover 17 by turning the cover a short distance in one or the other direction.

The large handle 23 on cover 17 is provided for easy manipulation of the cover. Flange 20 is of substantial height and serves to protect the inside of cover 17 and gasket 19 against outside contact as when the cover is removed and placed on the ground.

The opening 10 is large for access within the tank for cleaning, and will receive large pieces of ice added directly to the water for cooling.

The tank is preferably provided with a high luster which will reflect a maximum amount of light thereby reducing the amount of heat adsorbed from the sunlight without requiring insulation.

The device is easily handled in large crowds and of substantial construction for serviceability.

By securing the fixture 3 and pump 4 in separate holes in the upper head 9 of tank 1, instead of in the cover 18, the fixtures and pump remain in the tank during filling and are not exposed to dirt and contamination as when the cover is laid on the ground during filling of the tank.

Various embodiments of the invention may be employed within the scope of the following claims.

I claim:

1. A portable drinking fountain adapted to be employed for players in sports events where sanitation is difficult to maintain, comprising an upstanding cylindrical metal tank adapted to contain drinking water under pressure, a pair of wheels disposed to support the tank for trundling at an angle and for stationary upright positioning of the same in use, a handle at the upper end of the tank disposed to cooperate therewith and with the wheels for trundling of the tank over rough ground and for lifting the tank manually, the upper end of said tank having a large central opening for filling with water and chunks of ice, an upstanding flange encircling said opening, an inverted cup-shaped closure for said opening having its top adapted to seal upon the upper edge of said flange and its sides adapted to extend downwardly freely for a substantial distance over said flange, bayonet interlocking means between said flange and the skirt of said closure member, said skirt serving as a support for said closure member when the latter is removed and which generally prevents dirt from coming into contact with the seal and inside surfaces of the cover both when removed and also when in place on the tank, an air pump removably secured in the top wall of the tank adjacent and to one side of said opening and closure member for pressurizing the tank, and at least one fountain fixture removably secured in the top wall of the tank spaced from said pump and adjacent and to one side of said opening and closure member for the discharge of water for individual drinking purposes, each said fixture having an inlet tube extending downwardly to the bottom of said tank, and said pump and fixture being separately removable for cleaning and sterilizing and being normally secured in place so that the insides thereof are not subject to contamination during use of the fountain or removal of said closure member from the tank.

2. A portable drinking fountain adapted to be employed for players in sports events where sanitation is difficult to maintain, comprising an upstanding cylindrical metal tank adapted to contain drinking water under pressure, the upper end of said tank having a large central opening for filling with water and chunks of ice, an upstanding flange encircling said opening, an inverted cup-shaped closure for said opening having its top adapted to seal upon the upper edge of said flange and its sides adapted to extend downwardly freely for a substantial distance over said flange, bayonet interlocking means between said flange and the skirt of said closure member, said skirt serving as a support for said closure member when the latter is removed and which generally prevents dirt from coming into contact with the seal and inside surfaces of the cover both when removed and also when in place on the tank, an air pump removably secured in the top wall of the tank adjacent and to one side of said opening and closure member for pressurizing the tank, and at least one fountain fixture removably secured in the top wall of the tank spaced from said pump and adjacent and to one side of said opening and closure member for the discharge of water for individual drinking purposes, each said fixture having an inlet tube extending downwardly to the bottom of said tank, and said pump and fixture being separately removable for cleaning and sterilizing and being normally secured in place so that the insides thereof are not subject to contamination during use of the fountain or removal of said closure member from the tank.

3. A portable drinking fountain adapted to be employed for players in sports events where sanitation, speed of service, and ease of mobility are essential, comprising an upstanding cylindrical metal tank adapted to contain drinking water under pressure, the upper end of said tank having a large central opening for filling with water, an upstanding flange encircling said opening, an inverted cup-shaped closure for said opening having its top adapted to seal upon the upper edge of said flange and its sides adapted to extend downwardly freely for a substantial distance over said flange, the sides serving as a support for said closure member when the latter is removed and which generally prevents dirt from coming into contact with the seal and inside surface of the cover both when removed and on the tank, an air pump and a plurality of fountain fixtures removably secured in the top wall of the tank and circumferentially spaced abreast of said opening and closure member, and a pair of wheels disposed to support the tank for trundling at an angle, the axis for said wheels being offset from the axis of said tank whereby the bottom edge of said tank serves as a third point of support when the fountain is stationary, the three-point support providing a solid base for the fountain's use by a plurality of persons without a reduction in mobility.

HERMAN BEHRENS.

REFERENCES CITED

The following references are of record in the file of this patent:

UNITED STATES PATENTS

| Number | Name | Date |
|---|---|---|
| 640,118 | Eck | Dec. 26, 1899 |
| 1,038,399 | Lindsay | Sept. 10, 1912 |
| 1,691,097 | Waters | Nov. 13, 1928 |
| 2,031,172 | Maloney | Feb. 18, 1936 |
| 2,238,093 | Brandt | Apr. 15, 1941 |
| 2,529,645 | Winks | Nov. 14, 1950 |

FOREIGN PATENTS

| Number | Country | Date |
|---|---|---|
| 594,835 | France | July 4, 1925 |